(12) United States Patent
Sasakawa et al.

(10) Patent No.: US 9,446,970 B2
(45) Date of Patent: Sep. 20, 2016

(54) MEMBRANE MODULE UNIT AND ASSEMBLY METHOD, DISASSEMBLY METHOD, AND MAINTENANCE METHOD FOR SAME, AND WATER-TREATMENT APPARATUS

(75) Inventors: Manabu Sasakawa, Toyohashi (JP); Yoshihito Nakahara, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 1007 days.

(21) Appl. No.: 13/202,865

(22) PCT Filed: Feb. 24, 2010

(86) PCT No.: PCT/JP2010/001243
§ 371 (c)(1),
(2), (4) Date: Oct. 4, 2011

(87) PCT Pub. No.: WO2010/098089
PCT Pub. Date: Sep. 2, 2010

(65) Prior Publication Data
US 2012/0012514 A1    Jan. 19, 2012

(30) Foreign Application Priority Data

Feb. 24, 2009    (JP) .................................. 2009-041015

(51) Int. Cl.
*C02F 1/44*        (2006.01)
*B01D 63/02*       (2006.01)
(Continued)

(52) U.S. Cl.
CPC ............ *C02F 1/444* (2013.01); *B01D 63/026* (2013.01); *B01D 63/043* (2013.01); *B01D 2313/06* (2013.01); *B01D 2313/21* (2013.01);
(Continued)

(58) Field of Classification Search
None
See application file for complete search history.

(56) References Cited

U.S. PATENT DOCUMENTS 6,277,209 B1    8/2001  Yamada et al.
6,325,928 B1 *  12/2001 Pedersen et al. ............. 210/232
(Continued)

FOREIGN PATENT DOCUMENTS

EP    0 951 935 A2    10/1999
JP    5-63632 U       8/1993
(Continued)

OTHER PUBLICATIONS

Office Action issued May 31, 2013 in Korean Application No. 10-2011-7021819 (With English Translation).
(Continued)

*Primary Examiner* — Krishnan S Menon
(74) *Attorney, Agent, or Firm* — Oblon, McClelland, Maier & Neustadt, L.L.P.

(57) ABSTRACT

Disclosed is a membrane module unit in which a plurality of membrane modules is coupled together in parallel by coupling means, the membrane module including a sheet-like filter membrane and holding frame members that hold the filter membrane at two opposed sides of a peripheral edge of the filter membrane, wherein the coupling means clamps the holding frame members at the same sides of the filter membranes together by two opposed clamping members. According to the invention, provided is a membrane module unit in which structure is simple, assembly, disassembly, and maintenance can be easily performed, and a plurality of membrane modules can be reliably coupled together. Provided are also an assembly method, disassembly method, and maintenance method of the same, and a water-treatment apparatus.

25 Claims, 11 Drawing Sheets

(51) Int. Cl.
*C02F 3/12* (2006.01)
*B01D 63/04* (2006.01)
(52) U.S. Cl.
CPC ....... *B01D2313/56* (2013.01); *B01D 2315/06* (2013.01); *C02F 3/1273* (2013.01); *Y02W 10/15* (2015.05); *Y10T 29/49815* (2015.01); *Y10T 29/49826* (2015.01)

(56) References Cited

U.S. PATENT DOCUMENTS

| | | | |
|---|---|---|---|
| 6,899,811 B2 * | 5/2005 | Cote et al. | 210/330 |
| 2003/0010690 A1 * | 1/2003 | Okajima et al. | 210/151 |
| 2005/0123727 A1 | 6/2005 | Hester et al. | |
| 2010/0237014 A1 * | 9/2010 | Pedersen et al. | 210/650 |

FOREIGN PATENT DOCUMENTS

| | | |
|---|---|---|
| JP | 7-16591 A | 1/1995 |
| JP | 7-299339 | 11/1995 |
| JP | 8-332356 A | 12/1996 |
| JP | 09 075683 | 3/1997 |
| JP | 9-253462 A | 9/1997 |
| JP | 9-276669 | 10/1997 |
| JP | 10 180052 | 7/1998 |
| JP | 11-57424 | 3/1999 |
| JP | 2000-5571 A | 1/2000 |
| JP | 2000-126558 A | 5/2000 |
| JP | 2002-248323 A | 9/2002 |
| JP | 2002-336658 A | 11/2002 |
| JP | 2007 512952 | 5/2007 |
| JP | 2007-152179 | 6/2007 |
| JP | 2007 209949 | 8/2007 |
| JP | 2007 296432 | 11/2007 |
| JP | 2007 531624 | 11/2007 |
| JP | 2008 100137 | 5/2008 |
| JP | 2008-237960 A | 10/2008 |
| KR | 20-0268096 | 3/2002 |
| KR | 20-0402163 | 11/2005 |
| KR | 10-0856385 | 9/2008 |

OTHER PUBLICATIONS

Extended Search Report issued Jun. 6, 2013 in European Application No. 10745974.5.
International Search Report issued May 25, 2010 in PCT/JP10/001243 filed Feb. 24, 2010.
Japanese Office Action issued Apr. 23, 2013 in Patent Application No. 2010-511006 with English Translation.
Office Action issued Jan. 29, 2014 in Korean Application No. 10-2011-7021819 (With English Translation).

* cited by examiner

MEMBRANE MODULE UNIT AND ASSEMBLY METHOD, DISASSEMBLY METHOD, AND MAINTENANCE METHOD FOR SAME, AND WATER-TREATMENT APPARATUS

TECHNICAL FIELD

The invention relates to a membrane module unit, and an assembly method, disassembly method, and maintenance method of the same, and a water treatment apparatus.

Priority is claimed on Japanese Patent Application No. 2009-041015, filed Feb. 24, 2009, the content of which is incorporated herein by reference.

BACKGROUND ART

A membrane module is used for the water treatment that performs solid-liquid separation. As the membrane module, for example, there is known a hollow fiber membrane module having a hollow fiber membrane bundle in which a plurality of hollow fiber membranes is drawn and aligned in one direction, and holding members that hold the hollow fiber membrane bundle at both ends of the hollow fiber membrane in the length direction thereof. In recent years, making a plurality of membrane modules into a unit is performed due to an increase in the amount of raw water to be treated.

As a membrane module unit in which a plurality of membrane modules is made into a unit, for example, the following membrane module unit is known.

(1) A membrane module unit in which both ends of a plurality of hollow fiber membrane modules are connected to water collection headers fixed to a substantially rectangular parallelepiped frame (Patent Documents 1 and 2).

(2) A membrane module unit that is made into a unit by housing a plurality of hollow fiber membrane modules within a substantially rectangular parallelepiped frame, and holding both ends of the modules by the frame (Patent Document 3).

However, there are the following problems in the units (1) and (2).

(i) First, it is necessary to assemble the frame.

(ii) Since a plurality of the hollow fiber membrane modules should be attached to the frame one by one, the assembly of the units is complicated, and since a plurality of the hollow fiber membrane modules is removed one by one from the units, disassembly and maintenance (washing, checking, or the like) are complicated.

(iii) The structure of the units becomes complicated, in order to enhance sealing performance or durability against vibration, stress or the like at a connection between the collection water header or the frame and the hollow fiber membrane modules, or to suppress vibration of the hollow fiber membrane modules themselves.

Particularly, in recent years, since the membrane modules and the unit thereof are enlarged due to a further increase in the amount of raw water to be treated, it becomes difficult to easily handle the membrane modules and the unit. Additionally, with the enlargement, in the frame or the membrane modules, dimensional errors are likely to be caused, or distortion is likely to occur. Therefore, it becomes difficult to reliably couple and fix a plurality of the membrane modules.

CITATION LIST

Patent Documents

[Patent Document 1]
Japanese Unexamined Patent Application Publication No. 2007-296432
[Patent Document 2]
Japanese Unexamined Patent Application Publication No. 2008-100137
[Patent Document 3]
PCT Japanese Translation Patent Publication No. 2007-531624

DISCLOSURE OF INVENTION

Problems to be Solved by the Invention

The invention provides a membrane module unit in which structure is simple, assembly, disassembly, and maintenance can be easily performed, and a plurality of membrane modules can be reliably coupled together, and also provide an assembly method, disassembly method, and maintenance method for the same, and a water treatment means.

Means to Solve the Problems

A first aspect of the hollow fiber membrane module unit of the invention is a membrane module unit in which a plurality of membrane modules is coupled together in parallel by coupling means, the membrane module including a sheet-like filter membrane and holding frame members that hold the filter membrane at two opposed sides of a peripheral edge of the filter membrane, wherein the coupling means clamps the holding frame members at the same sides of the filter membranes together by two opposed clamping members.

Preferably, the membrane module includes a sheet-like filter membrane, holding frame members that hold the filter membrane at two opposed sides of a peripheral edge of the filter membrane, and supporting frame members that couple the holding frame members near both ends of the holding frame members, wherein the coupling means clamps the holding frame members at the same sides of the filter membranes or the supporting frame members at the same ends of the holding frame members together by two opposed clamping members.

Preferably, the hollow fiber membrane module unit of the invention further includes a self-standing frame, wherein at least one clamping member of two opposed clamping members that clamp the holding frame members, and the frame are combined together by combining means.

Preferably, one or both clamping members that is (are) combined with the frame by the combining means is (are) fastened to the frame by fastening means near both ends of the clamping member(s).

Another aspect of the hollow fiber membrane module unit of the invention is a membrane module unit in which a plurality of membrane modules is coupled together in parallel by coupling means, wherein the membrane module including a sheet-like filter membrane, holding frame members that hold the filter membrane at two opposed sides of a peripheral edge of the filter membrane, and supporting frame members that couple the holding frame members near both ends of the holding frame members, wherein the coupling means clamps the holding frame members at the same sides of the filter membranes and/or the supporting frame members at the same ends of the holding frame members together by two opposed clamping members.

Preferably, the coupling means clamps the holding frame members at the same sides of either upper ends or lower ends of the filter membranes by two opposed clamping members.

Preferably, the clamping members are formed with a plurality of grooves into which the holding frame members or the supporting frame members fit.

Preferably, the coupling means further has fastening means that couples the two clamping members together.

Preferably, the dry mass of the membrane module is 25 kg or more.

Preferably, the coupling means clamps the holding frame members at the same side of the filter membrane, and/or the supporting frame members at the same end of the holding frame members at one end or both ends thereof by two opposed clamping members.

A manufacturing method of a membrane module unit of the invention includes lifting a plurality of membrane modules in parallel, and coupling the membrane modules together by the coupling means.

A disassembly method of a membrane module unit of the invention includes lifting the membrane module unit, and removing the coupling means.

A maintenance method of a membrane module unit of the invention includes lifting, washing and/or checking the membrane module unit.

A water treatment apparatus of the invention includes a water tank; the membrane module unit of the invention arranged within the water tank; and diffuser means arranged below the membrane module unit.

A coupling means of the invention is a coupling means coupling a plurality of membrane modules together in parallel in which the membrane module unit has a sheet-like filter membrane, holding frame members that hold the filter membrane at two opposed sides of a peripheral edge of the filter membrane, and supporting frame members that couples the holding frame members together near both ends thereof, wherein the holding frame members at the same sides of the filter membranes or the supporting frame members at the same ends of the holding frame members are clamped together by two opposed clamping members.

In the coupling means, preferably, the membrane module further includes supporting frame members that couple the holding frame members near both ends thereof, and the holding frame members at the same sides of the filter membranes and/or the supporting frame members at the same ends of the holding frame members are clamped together by two opposed clamping members.

Effects of the Invention

The membrane module unit of the invention has simple structure, can easily perform assembly, disassembly, and maintenance and can reliably connect a plurality of membrane modules.

According to the assembly method of a membrane module unit of the invention, assembly of the membrane module unit can be easily performed.

According to the disassembly method of a membrane module unit of the invention, disassembly of the membrane module unit can be easily performed.

According to the maintenance method of a membrane module unit of the invention, maintenance of the membrane module unit can be easily performed.

The water treatment apparatus of the invention can easily perform attachment, removal, and maintenance of the membrane module unit.

According to the coupling means of the invention, the structure of the membrane module unit becomes simple, assembly, disassembly, and maintenance of the membrane module unit can be easily performed, and a plurality of the membrane modules can be reliably coupled.

BRIEF DESCRIPTION OF THE DRAWINGS

FIG. 3 is seen from the longitudinal direction of the coupling means.

EMBODIMENTS FOR CARRYING OUT THE INVENTION

Membrane Module Unit

Figure 1A:
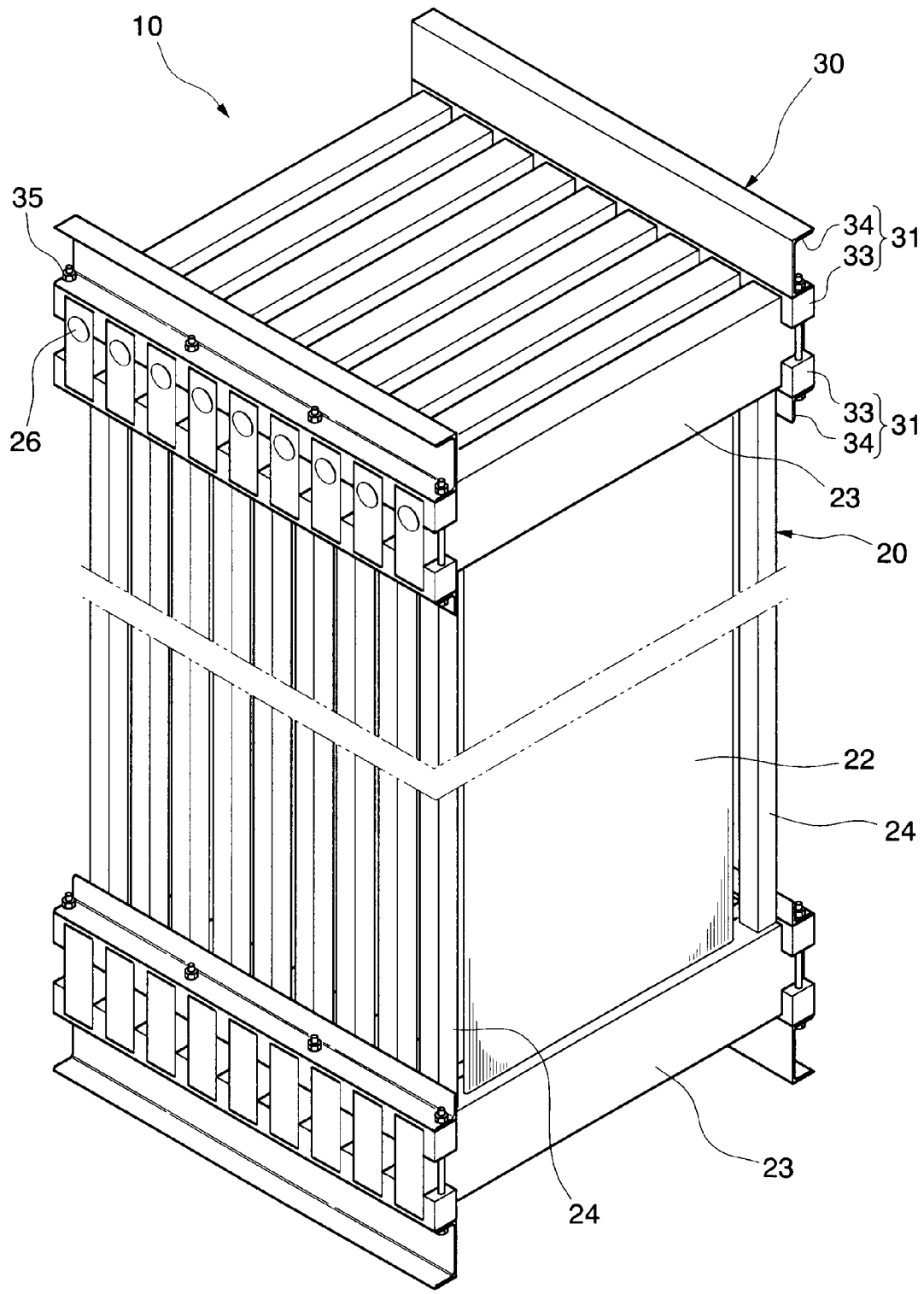
FIG. 1A is a perspective view showing an example of a membrane module unit of the invention.

FIG. 1A is a perspective view showing an example of a membrane module unit of the invention.

A hollow fiber membrane module unit 10 is a substantially rectangular parallelepiped unit that has a plurality of hollow fiber membrane modules 20, and coupling means 30 that couples the modules together in parallel.

Figure 1B:
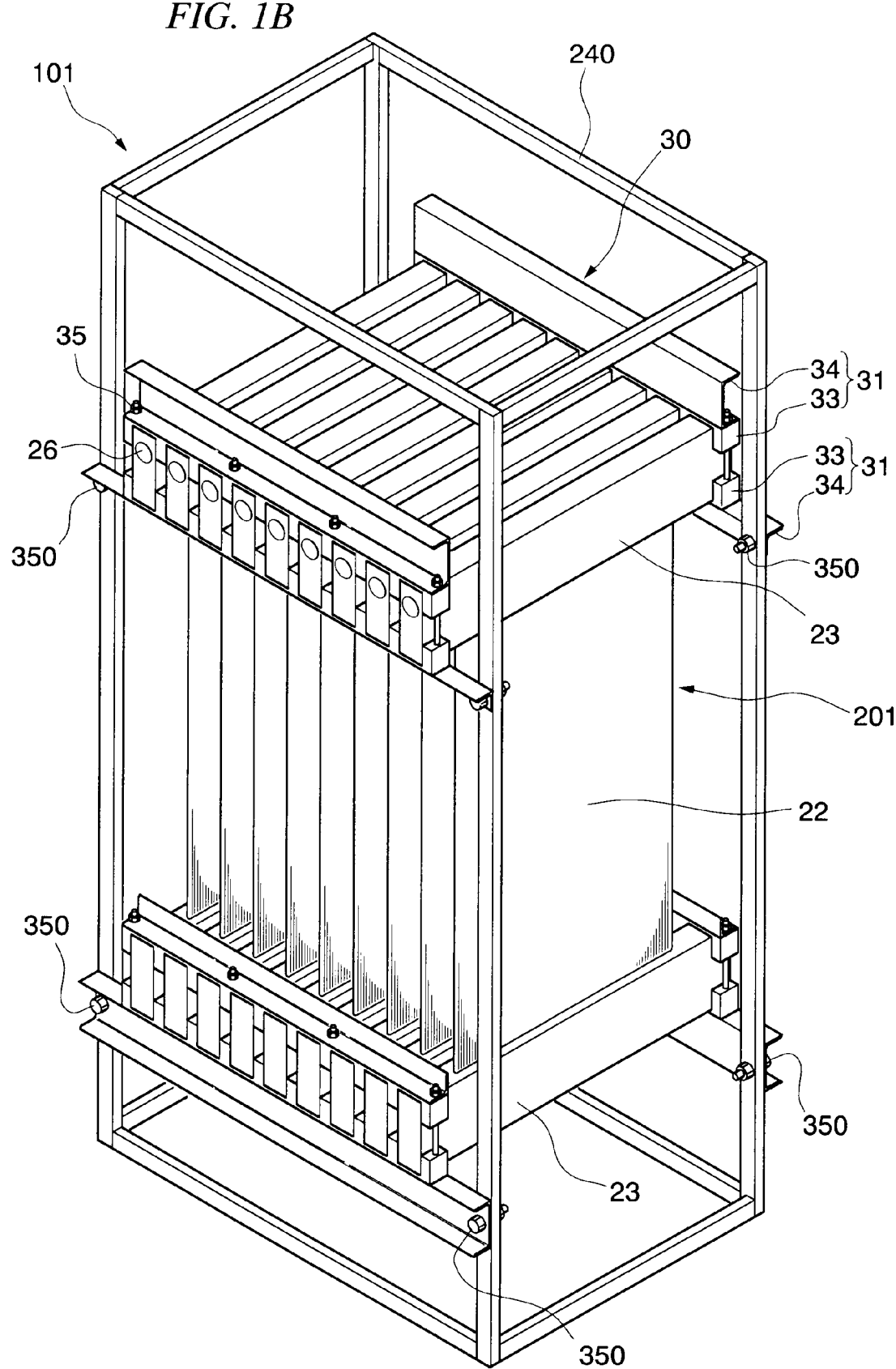
FIG. 1B is a perspective view showing another example of the membrane module unit of the invention.

FIG. 1B is a perspective view showing an example of the membrane module unit of the invention. A hollow fiber membrane module unit 101 is a substantially rectangular parallelepiped unit that has a plurality of hollow fiber membrane modules 201, coupling means 30 that couples the modules together in parallel, and a substantially rectangular parallelepiped self-standing frame 240. The coupling means 30 and the frame 240 are fastened together by fastening means 350 near both ends of a supporting portion 34 that extends laterally, respectively, and has a U-shaped or L-shaped cross-section, at both ends of the coupling means 30 in the length direction thereof. The fastening means 350 are, for example, bolts and nuts. As for the holes that allow the fastening means, such as the bolts, provided in the supporting portion to pass therethrough, the shape of openings of the holes may be an ellipse or may be a true circle. For the purpose of adjustment of the vertical position of the coupling means, at least one of the opening shapes is preferably an ellipse. Additionally, instead of the fastening means, the coupling means 30 and the frame may be combined together by combining means including welding or the like. The combining means includes the fastening means.

In the hollow fiber membrane module unit 101 of FIG. 1B, holding frame members 23 of upper and lower ends of the hollow fiber membrane modules 201 are clamped by the coupling means 30, respectively, and each coupling means 30 is fastened to the frame 240 near both ends thereof.

Figure 1C:
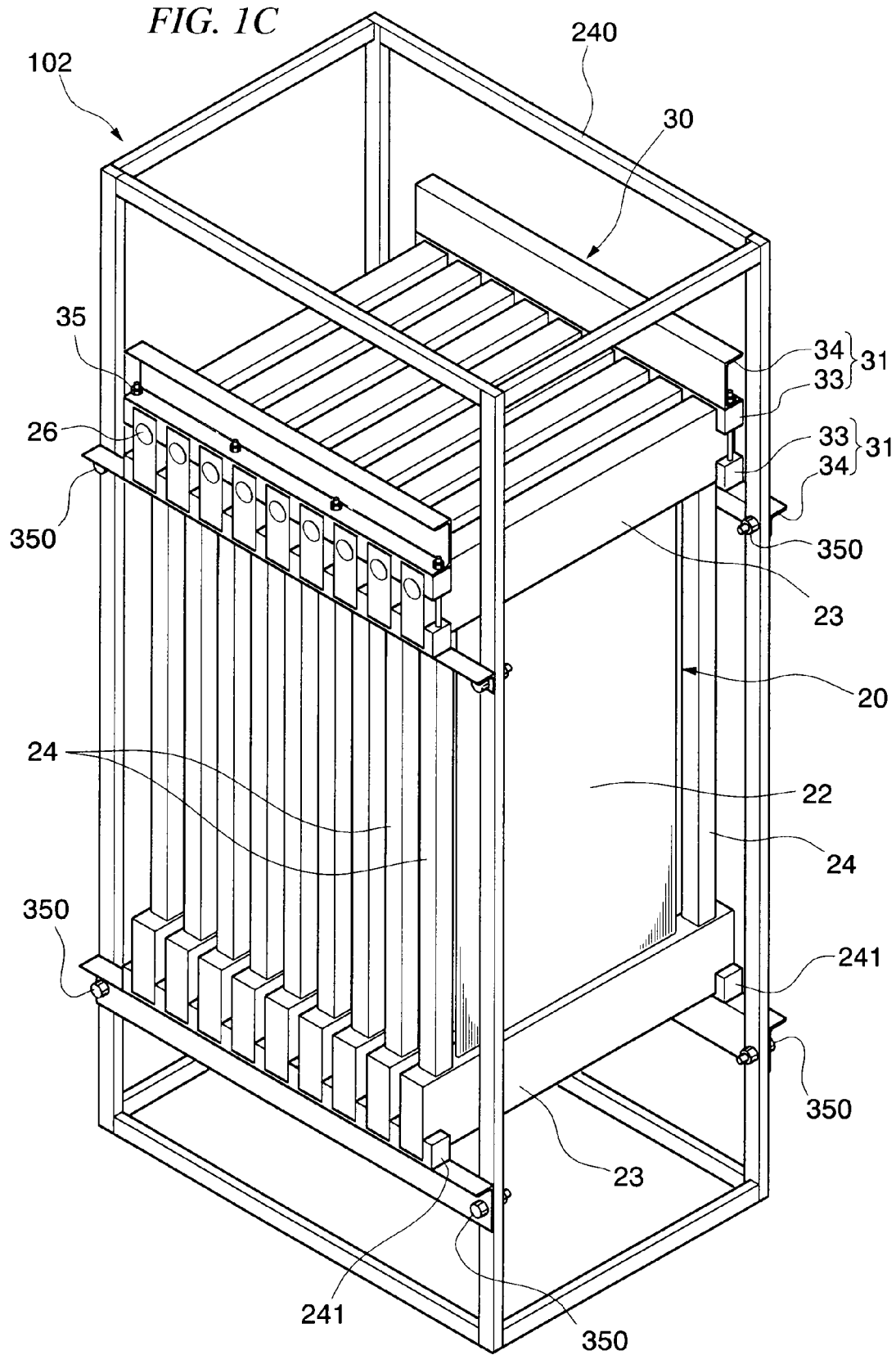
FIG. 1C is a perspective view showing still another example of the membrane module unit of the invention.

FIG. 1C is a perspective view showing an example of a membrane module unit of the invention.

A hollow fiber membrane module unit 102 is a substantially rectangular parallelepiped unit that has a plurality of hollow fiber membrane modules 20, a coupling means 30 that couples the modules together in parallel, and a substantially rectangular parallelepiped self-standing frame 240. The coupling means 30 and the frame 240 are fastened together by fastening means 350 near both ends of a supporting portion 34 that extends laterally, respectively, and has a U-shaped or L-shaped cross-section, at both ends of the coupling means 30 in the length direction thereof. The fastening means 350 are, for example, bolts and nuts. As for the holes that allow the fastening means, such as the bolts, provided in the supporting portion to pass therethrough, the shape of openings of the holes may be an ellipse or may be a true circle. For the purpose of adjustment of the vertical position of the coupling means, at least one of the opening shapes is preferably an ellipse. Additionally, instead of the fastening means, the coupling means 30 and the frame may be combined together by combining means including welding or the like. The combining means includes the fastening means.

In the hollow fiber membrane module unit 102 of FIG. 1C, the holding frame members 23 of the upper ends of the hollow fiber membrane modules 20 are clamped by the coupling means 30, and the coupling means 30 is fastened to the frame 240 near both ends thereof. Additionally, a plurality of the holding frame members 23 of the lower ends of the hollow fiber membrane modules 20 is respectively carried in recesses of a comb tooth portion 241 provided at the frame 240.

As the materials of the comb tooth portion 241, arbitrary materials that have durability under the conditions of use of the hollow fiber membrane module unit 102 may be used. For example, the materials of the tooth comb portion includes stainless steel, polycarbonate, polysulfone, polyolefin, modified polyphenylene ether, ABS resin, polyvinyl chloride, fiber strengthening resin, an elastic body (rubber), and the like. The comb tooth portion 241 may be produced from resin and may have an elastic body pasted on the surface thereof. The elastic body includes, for example, NBR, EPDM, fluorine-based rubber, silicone rubber, and the like.

In the example of the hollow fiber membrane module unit 102 of FIG. 1C, the coupling means 30 is provided at upper parts of the hollow fiber membrane modules 20. However, the coupling means 30 may be provided at lower parts of the hollow fiber membrane modules 20, and may be provided at both the upper and lower parts.

It is preferable that the holding frame members 23 each of which is equipped with at least an intake 26 be clamped by the coupling means 30, and the coupling means 30 and the frame be fastened by the fastening means 350.

(Hollow Fiber Membrane Module)

Figure 2A:
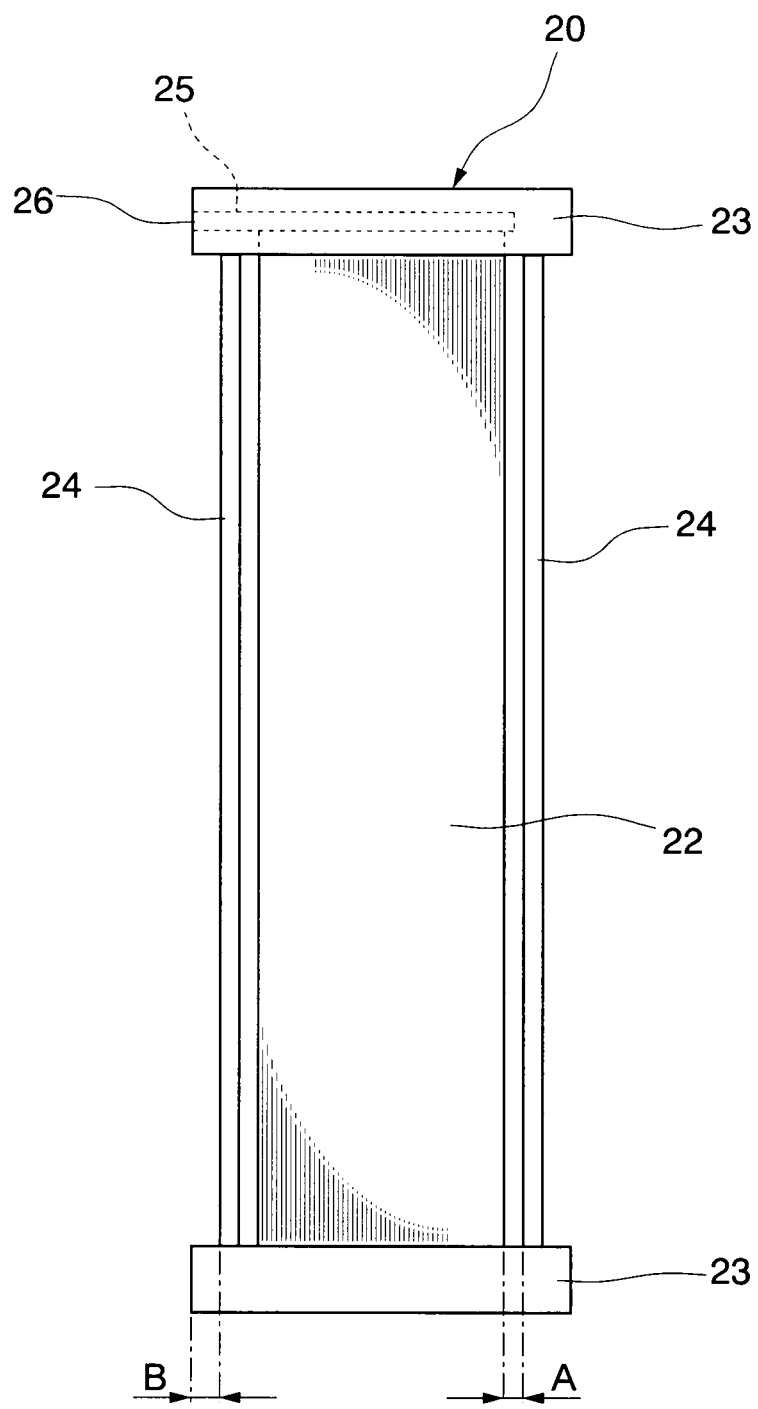
FIG. 2A is a front view showing an example of a membrane module.

The hollow fiber membrane module 20 of FIG. 2A has a sheet-like hollow fiber membrane bundle 22 in which a plurality of hollow fiber membranes is drawn and aligned in one direction, a total of two holding frame members 23 that hold the hollow fiber membrane bundle 22 at upper and lower ends, respectively, of the hollow fiber membranes in the length direction thereof (that is, two opposed sides of a peripheral edge of the sheet-like hollow fiber membrane bundle 22), and a total of two supporting frame members 24 that couples the holding frame members 23 together near both ends thereof that protrude laterally of the hollow fiber membrane bundle 22.

A gap A between the supporting frame member 24 and the hollow fiber membrane bundle 22 is preferably 30 mm or more so that the space for causing a lifting tool that will be described below to be put along one end of the holding frame member 23 can be secured. Additionally, since useless space increases if the gap A is too long, this gap is preferably 200 mm or less.

The length B of the portion of the holding frame member 23 that protrudes laterally more than the supporting frame member 24 is preferably 30 mm or more so that the space for causing the coupling means 30 to be put along the one end of the holding frame member 23 can be secured. Additionally, since useless space increases if the length B is too long, this length is preferably 200 mm or less.

Figure 2B:
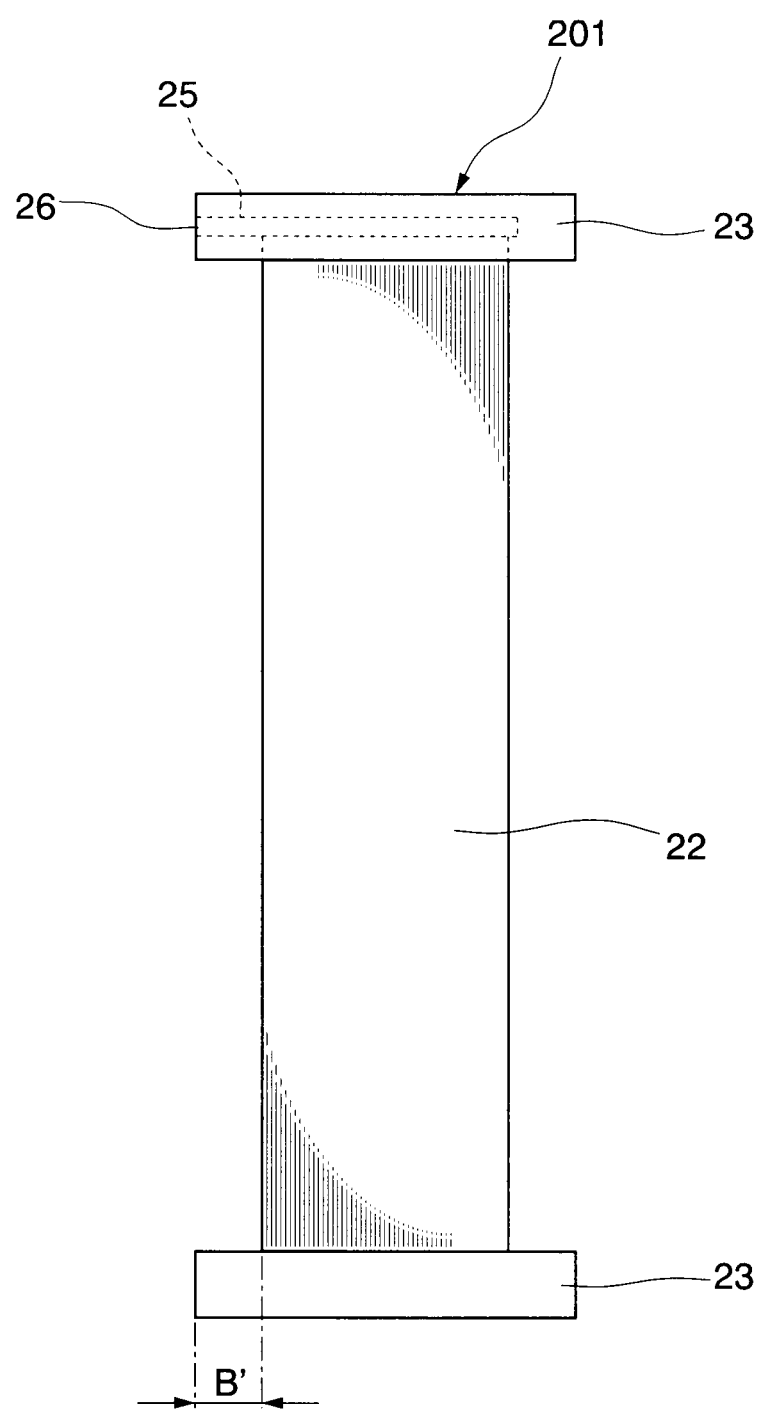
FIG. 2B is a front view showing another example of the membrane module.

The hollow fiber membrane module 201 of FIG. 2B has the structure in which two supporting frame members 24 are removed from the hollow fiber membrane module 20 of FIG. 2A.

The length B' of the portion of the holding frame member 23 that protrudes laterally more than both side ends of the hollow fiber membrane bundle 22 is preferably 30 mm or more so that the space for causing the coupling means 30 to be put along the one end of the holding frame member 23 can be secured. Additionally, since useless space increases if the length B' is too long, this length is preferably 200 mm or less.

(Hollow Fiber Membrane Bundle)

The hollow fiber membrane bundle 22 may be a single-layer sheet, and may be a multi-layer sheet.

The single-layer sheet includes, for example, a sheet in which a plurality of hollow fiber membranes is drawn and aligned simply in one direction; a sheet in which a plurality of hollow fiber membranes is drawn and aligned in one direction, and the respective hollow fiber membranes are bundled by constraint yarns (multifilament yarn, spun yarn, or the like) of chain stitch; a sheet (Russell stitch sheet) in which respective hollow fiber membranes are folded back into a sheet multiple times in zigzags, and the folded-back portions are bundled by constraint yarns of chain stitch.

The multi-layer sheet includes, for example, a sheet in which a single-layer sheet is folded back into a U-shape once or more; and a sheet in which a plurality of single-layer sheets is overlapped with each other.

The materials of the hollow fiber membrane include, for example, polyolefin, cellulose, polyvinyl alcohol, polysulfone, polymethylmethacrylate, polyvinylidene fluoride, and polyethylene fluoride, polyacrylonitrile, ceramics, and compounds thereof.

The hollow fiber membrane can be used as the filter membrane, and hole diameter, porosity, membrane thickness, external diameter, and the like are not particularly limited.

(Holding Frame Member)

The holding frame member 23 is a long prismatic or angular tubular member, and a water collection passage 25 for collecting treated water filtered from the raw water side of a hollow fiber membrane toward the permeated water side thereof is formed inside at least one holding frame member 23.

One end of the hollow fiber membrane bundle 22 is fixed to the holding frame member 23 by a potting portion (not shown) after the inside and water collection passage of the hollow fiber membrane communicate with each other.

At least one end of the upper holding frame member 23 is formed with a discharge port 26 coupled to a water collection header (not shown).

As the materials of the holding frame member 23, arbitrary materials that have durability against raw water and can endure pressure during filtering may be used. For example, the materials of the holding frame member include polycarbonate, polysulfone, polyolefin, modified polyphenylene ether, ABS resin, and polyvinyl chloride.

In order to improve the handling performance of the hollow fiber membrane module 20 or 201, the holding frame member 23 may have a hook portion that hooks a hook or the like for lifting; a space for winding a wire or lifting band for lifting; and an anti-slip portion, such as a grip.

As the materials of the potting portion, arbitrary materials that can fix the one end of the hollow fiber membrane bundle 22 to the holding frame member 23, can partition the raw water side and the permeated water side liquid-tightly, and have durability against raw water may be used. For example, the materials of the potting portion include a hardened material of a thermosetting resin, a thermoplastic resin, and the like.

The thermosetting resin includes, for example, an epoxy resin, an urethane resin, an unsaturated polyester resin, a silicone resin, and the like.

The potting portion can be formed, for example, by integrating the one end of the hollow fiber membrane bundle 22 into a block in a state where an opening thereof maintained, and thereafter, bonding and fixing the block-shaped object to an opening of the holding frame members 23 that extends in the longitudinal direction, using the same material as the potting material, in a state where the inside and water collection passage of a hollow fiber membrane communicate with each other.

(Supporting Frame Member)

The supporting frame member 24 is required in order to maintain the shape of the hollow fiber membrane module 20 and the hollow fiber membrane module unit 10 and to secure the self-standing performance and handling performance of the hollow fiber membrane module 20 and the hollow fiber membrane module unit 10.

The supporting frame member 24 is a long prismatic or angular tubular member, and may have the structure that can support the holding frame member 23 and can exhibit durability under the condition of use of the hollow fiber membrane module unit 10.

It is preferable that a channel that communicates with the water collection passage 25 inside the holding frame member 23 be formed inside the supporting frame member 24. The treated water that is filtered from the raw water side of a hollow fiber membrane toward the permeated water side thereof and is collected in the water collection passage of the lower holding frame member 23 can be collected in the water collection passage 25 of the upper holding frame member 23 through the channel of the supporting frame member 24, and can be discharged from the discharge port. Since the supporting frame member 24 and the holding frame member 23 can be used as the channels, it is unnecessary to add an extra structure or function for water collection to the hollow fiber membrane module unit 10.

As the materials of the supporting frame member 24, arbitrary materials that have sufficient strength and durability may be used. For example, the materials of the supporting frame member include stainless steel, polycarbonate, polysulfone, polyolefin, modified polyphenylene ether, ABS resin, polyvinyl chloride, fiber strengthening resin, and the like. In order to improve the handling performance of the hollow fiber membrane modules 20, the supporting frame member 24 may have a hook portion that hooks a hook or the like for lifting; and an anti-slip portion, such as a grip.

(Frame)

The frame 240 is required in order to maintain the shape of the hollow fiber membrane module 201 and the hollow fiber membrane module unit 101 or 102 that have the structure in which the supporting frame member 24 is not present and to secure the self-standing performance and handling performance of the hollow fiber membrane module 201 and the hollow fiber membrane module unit 101 or 102. Additionally, in a case where the structure in which the supporting frame member 24 is present is provided, the frame may be present. When either the upper or lower holding frame members of the hollow fiber membrane modules 20 are not coupled by the coupling means, it is preferable that the hollow fiber membrane module unit have a frame, and the holding frame members that are not coupled by the coupling means are respectively carried in the recesses of the comb tooth portion provided in the frame.

The frame stands alone in itself, is formed using a long prismatic or angular tubular member, and may have the structure that can support a plurality of the hollow fiber membrane modules 201 that are clamped by the coupling means 30 and can exhibit durability under the condition of use of the hollow fiber membrane module unit 101 or 102.

It is preferable that the frame 240 be provided with a channel that communicates with the water collection passage 25 inside the holding frame member 23. The treated water that is filtered from the raw water side of a hollow fiber membrane toward the permeated water side thereof and is collected in the water collection passage of the lower holding frame member 23 can be collected in the water collection passage 25 of the upper holding frame member 23 through the channels, and can be discharged from the discharge port.

As the materials of the frame 240, arbitrary materials that have sufficient strength and durability may be used. For example, the materials of the frame include stainless steel, polycarbonate, polysulfone, polyolefin, modified polyphenylene ether, ABS resin, polyvinyl chloride, fiber strengthening resin, and the like.

(Coupling Means)

The coupling means 30 clamps the holding frame members 23 at the same ends (that is, the same sides of the peripheral edges of the hollow fiber membrane bundles 22) of the hollow fiber membrane bundles 22 together by two clamping members 31 that are opposed to each other at one end of each holding frame member that protrudes laterally more than both side ends of the supporting frame members 24 or the hollow fiber membrane bundle 22, thereby connecting a plurality of the hollow fiber membrane modules 20 or 201 in parallel.

The coupling means 30 can clamp a plurality of the holding frame members 23 together at a total of four locations including both ends of the holding frame member 23 at the upper end of the hollow fiber membrane bundle 22, and both ends of the holding frame member 23 at the lower end of the hollow fiber membrane bundle 22.

In the clamping members 31, as shown in FIGS. 3A to 3C and 4, it is preferable that at least any one of opposed clamping members 31 have a comb tooth portion 33 formed with a plurality of grooves 32 into which the holding frame members 23 fit, and the supporting portion 34 having a U-shaped or L-shaped cross-section. The comb tooth portion 33 and the supporting portion 34 may be integrated or may be splittable.

When the hollow fiber membrane modules 20 having the supporting frame members are clamped, a plurality of grooves 32 fitted to the holding frame members 23 or supporting frame members are formed.

Figure 3A:
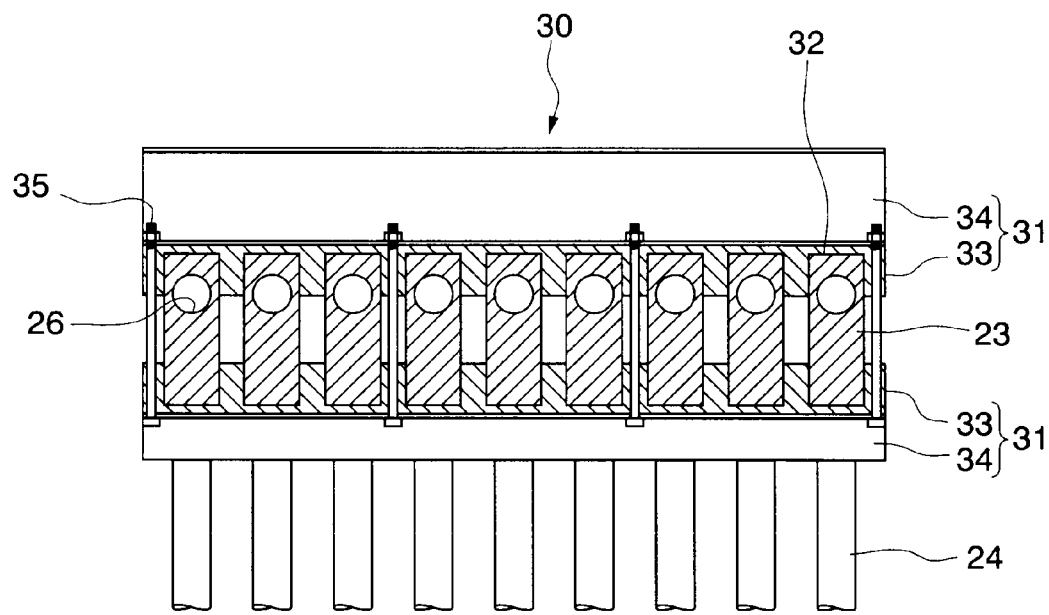
FIG. 3A is a partially enlarged view of an example of a membrane module unit showing that a plurality of holding frame members is clamped by coupling means.
Figure 3B:
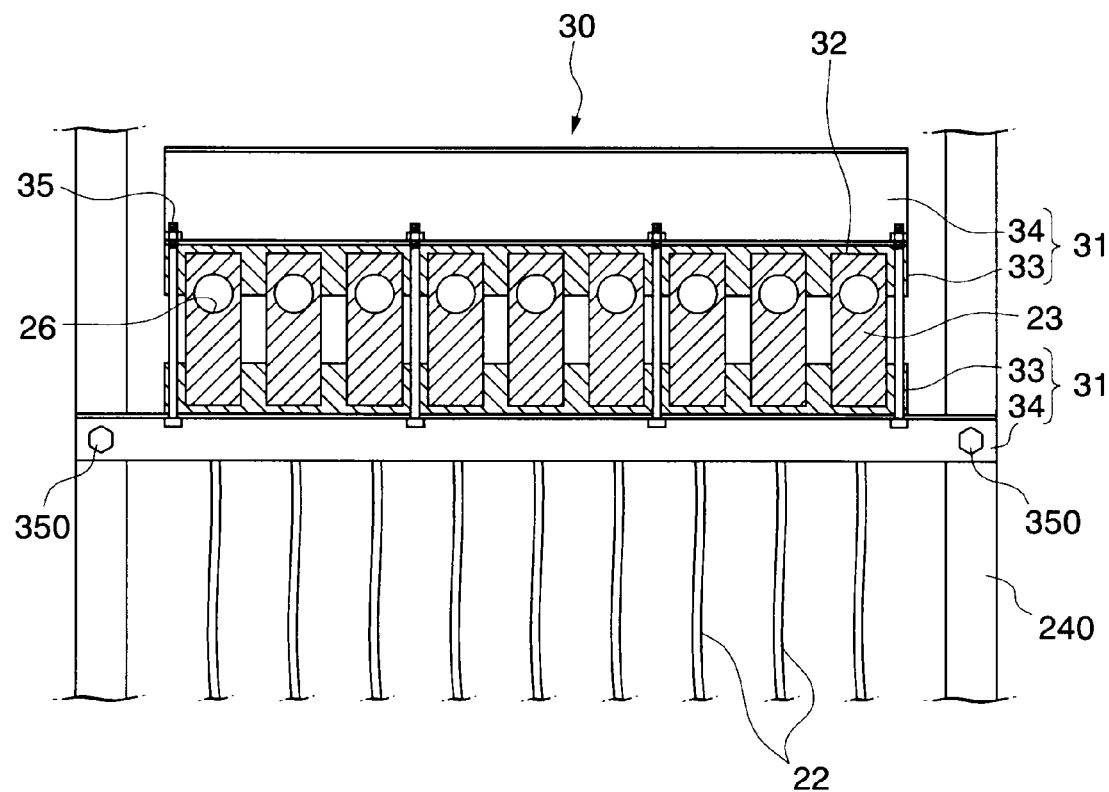
FIG. 3B is a partially enlarged view of another example of the membrane module unit showing that a plurality of holding frame members is clamped by the coupling means.
Figure 3C:
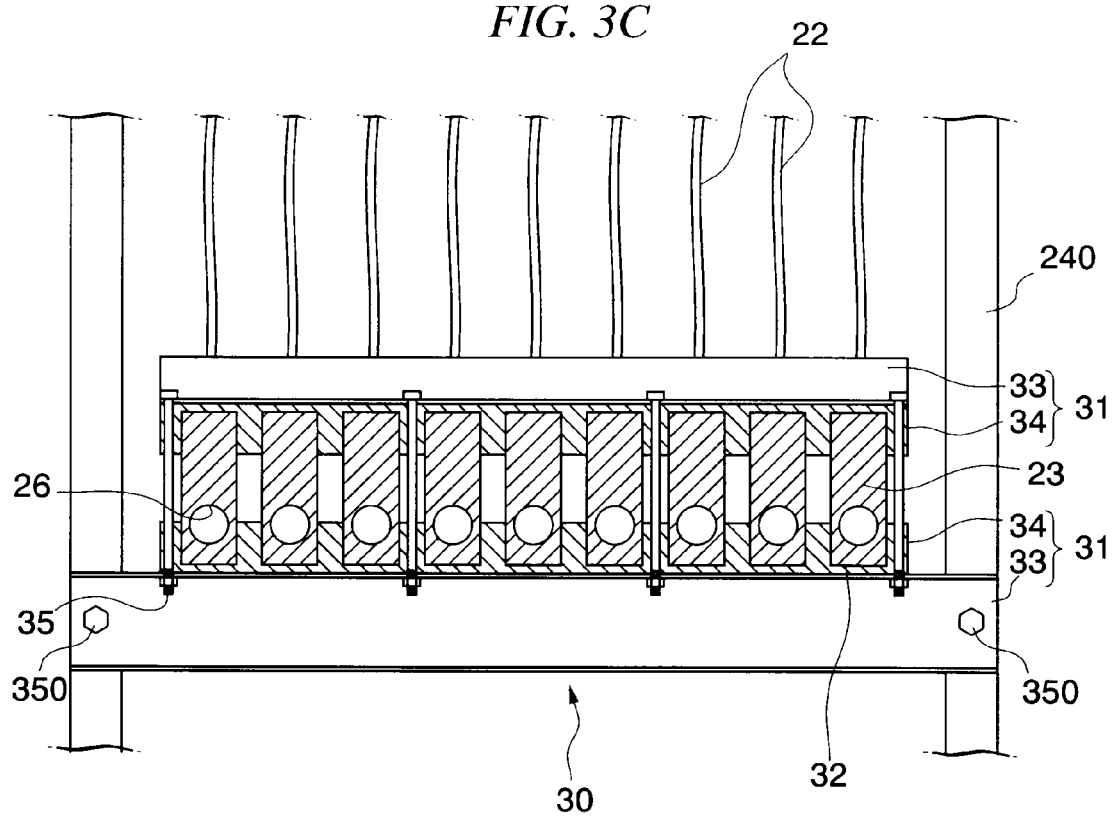
FIG. 3C is a partially enlarged view of still another example of the membrane module unit showing that a plurality of holding frame members is clamped by the coupling means.
Figure 4:
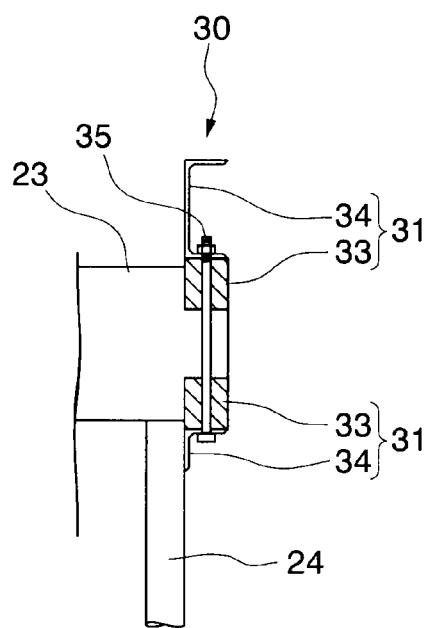
FIG. 4 is a partially enlarged view of an example of the membrane module unit when

As shown in FIGS. 3B and 3C, in the clamping members 31, the lower supporting portion 34 may extend laterally and may be fastened to the frame 240 by the fastening means 350. The shape of through holes provided in the supporting portion 34 in order to allow the fastening means 350 to pass therethrough may be an ellipse or may be a true circle. For the purpose of adjustment of the vertical position of the supporting portion 34, at least one of the hole shapes is preferably an ellipse.

As the materials of the comb tooth portion 33, arbitrary materials that have durability under the conditions of use of the hollow fiber membrane module unit 10 may be used. For example, the materials of the tooth comb portion includes stainless steel, polycarbonate, polysulfone, polyolefin, modified polyphenylene ether, ABS resin, polyvinyl chloride, fiber strengthening resin, an elastic body (rubber), and the like.

In a case where the supporting portion 34 has sufficient strength and the comb tooth portion 33 has resistance that fulfills a function, an elastic body is preferable as the material of the comb tooth portion 33. When a plurality of the hollow fiber membrane modules 20 or 201 is arranged, the comb tooth portion 33 that is an elastic body further increases the maintenance stability of the hollow fiber membrane modules 20 or 201 in a case where a gap is formed between the coupling means 30 and the hollow fiber membrane modules 20 or 201 due to the dimensional difference of the respective hollow fiber membrane modules 20 or 201. Additionally, the comb tooth portion 33 may be produced from resin and may have an elastic body pasted on the surface thereof. The elastic body includes, for example, NBR, EPDM, fluorine-based rubber, silicone rubber, and the like.

The materials of the supporting portion 34 include, for example, stainless steel, polycarbonate, polysulfone, polyolefin, modified polyphenylene ether, ABS resin, polyvinyl chloride, fiber strengthening resin, and the like.

In a case where the strength that supports large-sized hollow fiber membrane modules 20 is required, stainless steel is desirable because strength is high, handling performance or durability is excellent, and cost is low. Among standard items of stainless steel, stainless L steel with a size of 30 mm×30 mm is more preferable because the steel has large variation in thickness and is suitable to be used as the hollow fiber membrane module unit.

The coupling means 30 has further a plurality of fastening means 35 that connects two opposed clamping members 31. The fastening means 35 are bolts and nuts. Instead of bolts and nuts, band clamps or the like may be used.

The coupling means 30 may have connecting means for connecting a water collection header to an upper part of the hollow fiber membrane module unit 10; connecting means for connecting diffuser means to a lower part of the hollow fiber membrane module unit 10; a hook portion that hooks a hook or the like for lifting the hollow fiber membrane module unit 10; or a space for winding a wire or lifting band for lifting.

(Assembly Method)

In recent years, a number of large-sized hollow fiber membrane modules 20 or 201 are used due to an increase in the amount of raw water to be treated, and with this, the mass of the hollow fiber membrane modules 20 or 201 and the hollow fiber membrane module unit 10, 101, or 102 is also increased. Therefore, there is a limit to handling these with human power. Hence, when the hollow fiber membrane module unit 10, 101, or 102 is assembled, it is preferable to lift and handle the hollow fiber membrane modules.

The hollow fiber membrane module unit 10, 101, or 102 can be assembled according to the following procedure, for example.

Figure 5:
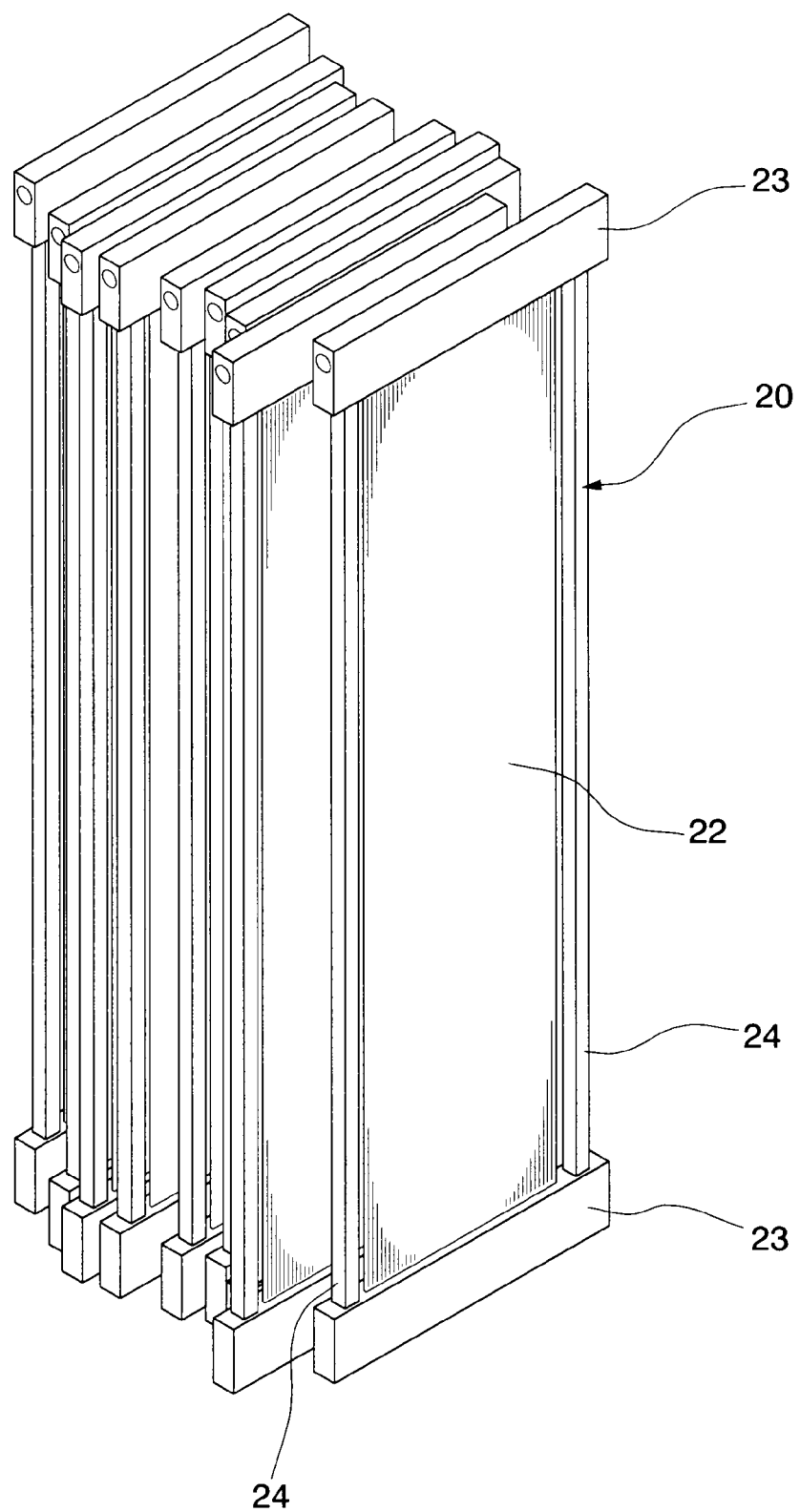
FIG. 5 is a perspective view showing one process in an assembly method of an example of the membrane module unit of the invention.

As shown in FIG. 5, a plurality of the hollow fiber membrane modules 20 is arranged such that the holding frame members 23 and the supporting frame member 24 are arranged in parallel, respectively, and such that the longitudinal direction of the holding frame members 23 becomes the horizontal direction, and the longitudinal direction of the supporting frame members 24 becomes substantially the vertical direction.

Figure 6:
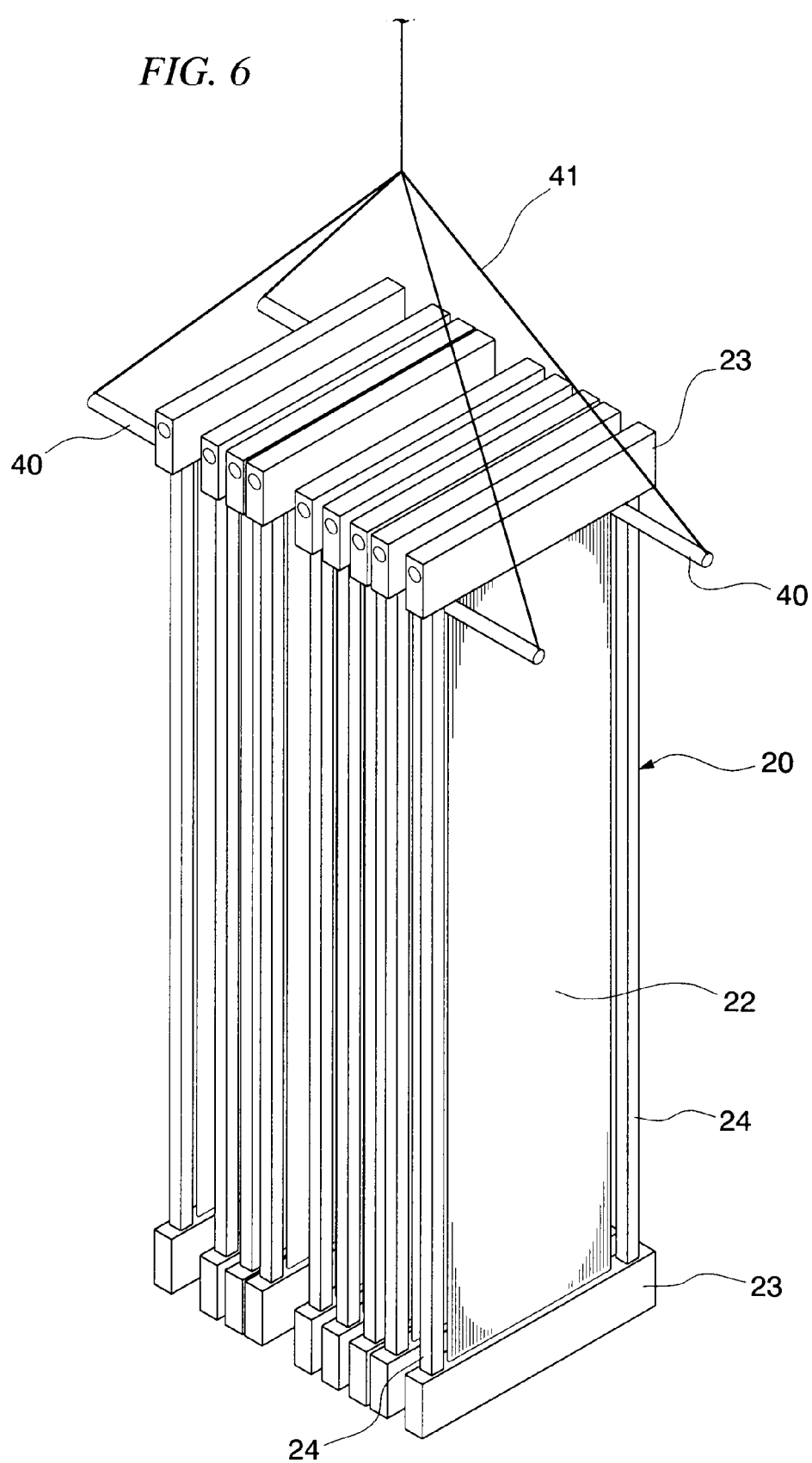
FIG. 6 is a perspective view showing one process in the assembly method of the example of the membrane module unit of the invention.

As shown in FIG. 6, a rod-shaped lifting tool 40 is inserted through all the gaps between the hollow fiber membrane bundles 22 and the supporting frame members 24 at the same side portions of the hollow fiber membrane bundles 22, and the lifting tool 40 is made to be put along lower sides of both ends of the holding frame members 23 at the upper ends of the hollow fiber membrane bundles 22.

Subsequently, a wire 41 that extends from lifting means (a crane, a pulley, or the like (not shown)) is connected to both ends of the lifting tool 40, and a plurality of the hollow fiber membrane modules 20 is lifted in parallel by the lifting means together with the lifting tool 40.

Figure 7:
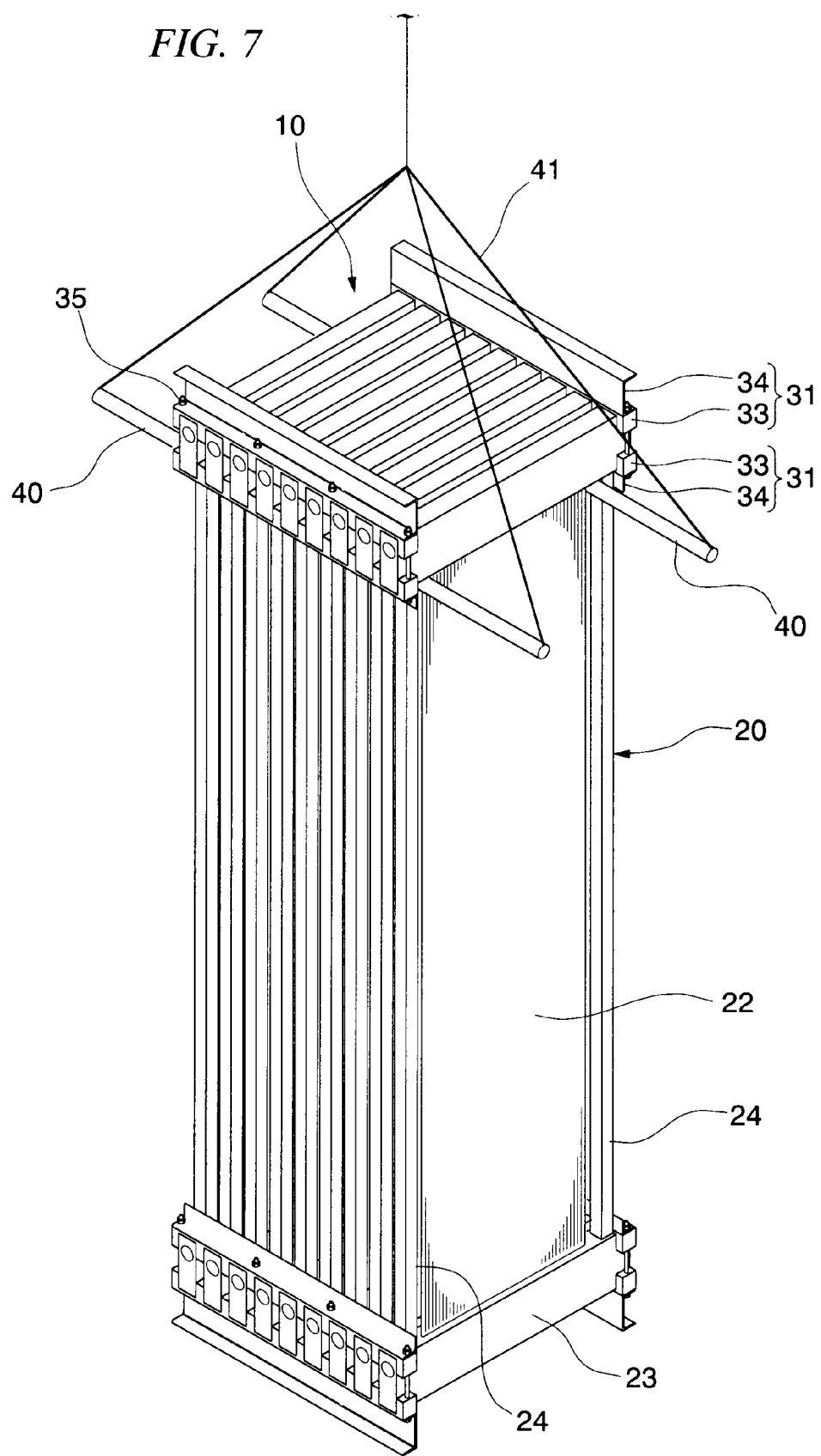
FIG. 7 is a perspective view showing one process in the assembly method of the example of the membrane module unit of the invention.

As shown in FIG. 7, a plurality of the hollow fiber membrane modules 20 is coupled together by aligning a plurality of the hollow fiber membrane modules 20 at certain intervals in a lifted state, and clamping a plurality of the holding frame members 23 together by the coupling means 30 at a total of four locations including both ends of the holding frame member 23 at the upper end of the hollow fiber membrane bundle 22, and both ends of the holding frame member 23 at the lower end of the hollow fiber membrane bundle 22.

In addition, an arm-shaped lifting tool may be used instead of the rod-shaped lifting tool 40. Additionally, a wire or lifting band that extends from the lifting means may be inserted through gaps between the hollow fiber membrane bundles 22 and the supporting frame members 24 without using the lifting tool 40.

The hollow fiber membrane module unit 101 or 102 can be assembled according to the above assembly method of the hollow fiber membrane module unit 10, using the hollow fiber membrane modules 201, instead of the hollow fiber membrane modules 20. That is, a plurality of the holding frame members 23 of a plurality of the hollow fiber membrane modules 201 that is lifted using suitable lifting means (a crane, a pulley, or the like) is clamped by the coupling means 30, a plurality of the hollow fiber membrane modules 20 is coupled together, and the coupling means 30 and the frame 240 are fastened together by fastening means, or combined together by other combining means.

(Disassembly Method)

The hollow fiber membrane module unit 10 can be disassembled according to the following procedure, for example.

The rod-shaped lifting tool 40 is inserted through all the gaps between the hollow fiber membrane bundles 22 and the supporting frame members 24 at the same side portions of the hollow fiber membrane bundles 22, and the lifting tool 40 is made to be put along lower sides of both ends of the holding frame members 23 at the upper ends of the hollow fiber membrane bundles 22.

Subsequently, a wire that extends from lifting means is connected to both ends of the lifting tool 40, and the hollow fiber membrane modules 10 is lifted by the lifting means together with the lifting tool 40.

The coupling means 30 that clamp a plurality of the holding frame members 23 together is removed in the lifted state from a total of four locations including both ends of the holding frame member 23 at the upper end of the hollow fiber membrane bundle 22, and both ends of the holding frame member 23 at the lower end of the hollow fiber membrane bundle 22.

The hollow fiber membrane module unit 101 or 102 can be disassembled according to the above disassembly method of the hollow fiber membrane module unit 10. That is, after fastening or combining between the coupling means 30 and the frame 240 is released, a plurality of the hollow fiber membrane modules 201 clamped by the coupling means 30 are lifted using suitable lifting means to remove the coupling means 30 that clamps a plurality of the holding frame members 23 together.

(Maintenance Method)

The hollow fiber membrane module unit 10 can be washed or checked according to the following procedure, for example.

The rod-shaped lifting tool 40 is inserted through all the gaps between the hollow fiber membrane bundles 22 and the supporting frame members 24 at the same side portions of the hollow fiber membrane bundles 22, and the lifting tool 40 is made to be put along lower sides of both ends of the holding frame members 23 at the upper ends of the hollow fiber membrane bundles 22.

Subsequently, a wire that extends from lifting means is connected to both ends of the lifting tool 40, and the hollow fiber membrane modules 10 is lifted by the lifting means together with the lifting tool 40.

In this state, the hollow fiber membrane module unit 10 may be washed or checked. In a case where the intervals of the hollow fiber membrane modules 20 is narrow, the coupling means 30 that clamps a plurality of the holding frame members 23 together may be removed, and then, each hollow fiber membrane module 20 may be washed or checked in the state of being lifted by the lifting tool 40.

Effects

In the hollow fiber membrane module unit 10 described above, the following effects are exhibited.

(i) Since the hollow fiber membrane module unit has the holding frame members 23 that hold the hollow fiber membrane bundle 22 at both ends thereof, the supporting frame members 24 that couple the holding frame members 23 together at both ends thereof, and the coupling means 30 that clamps the holding frame members 23 at the same ends of the hollow fiber membrane bundles 22 together at one end thereof, the holding frame members 23, the supporting frame members 24, and the coupling means 30 replaces the substantially rectangular parallelepiped frame. As a result, the hollow fiber membrane module unit 10 can be integrated and made to stand alone, without providing the frame for inserting hollow fiber membrane modules provided in a conventional hollow fiber membrane module unit. As a result, (i-1) the frame as in the related art becomes unnecessary, and the structure of the hollow fiber membrane module unit 10 becomes simple. Additionally, (i-2) it becomes unnecessary to assemble the frame as in the related art, and assembly of the hollow fiber membrane module unit 10 can be easily performed. Additionally, (i-3) at the time of coupling or disembody of the hollow fiber membrane module 20, the frame as in the related art that becomes an obstacle at the time of disassembly is eliminated, and assembly, disassembly, and maintenance of the hollow fiber membrane module unit 10 can be easily performed. Additionally, (i-4) it is not necessary to provide the frame as in the related art, and the mass of the hollow fiber membrane module unit 10 can be made light.

(ii) The coupling between a plurality of the hollow fiber membrane modules 20 can be performed only by coupling means 30 that clamps the holding frame members 23 at the same ends of the hollow fiber membrane bundles 22 together at one end thereof. As a result, (ii-1) the structure of the hollow fiber membrane module unit 10 becomes simple. Additionally (ii-2) assembly, disassembly, and maintenance of the hollow fiber membrane module unit 10 can be easily performed. Additionally, (ii-3) even if the hollow fiber membrane modules 20 are enlarged, and a dimensional error or distortion become large, a dimensional error or distortion at one end of the holding frame members 23 do not become so large, and a plurality of the hollow fiber membrane modules 20 can be reliably coupled and fixed.

(iii) The coupling means 30 is formed with a plurality of the grooves 32 into which the holding frame members 23 fit. As a result, (iii-1) lateral deviation of the hollow fiber modules 20 is not easily shifted laterally, sealing performance or durability against vibration, stress or the like at a connection with the water collection header can be enhanced, or vibration of the hollow fiber membrane modules 20 themselves can be suppressed. Additionally, (iii-2) since convex portions between the grooves 32 plays the role of spacers, the intervals of the hollow fiber membrane modules 20 is maintained, it is easy to wash the hollow fiber membrane bundles 22.

(iv) Since the coupling means 30 has further fastening means 35 that couples two clamping members 31, and a plurality of the hollow fiber membrane modules 20 can be more reliably coupled and fixed.

The invention is effective in a case where the hollow fiber membrane modules 20 with large mass are coupled together, and is particularly effective when handling the hollow fiber membrane modules with a dry mass of 25 kg or more.

(v) Instead of using the supporting frame members 24, in the hollow fiber membrane module unit 101 using the frame 240, the same effects as (ii), (iii), and/or (iv)) are exhibited excluding the above effect (i).

Other Embodiments

In addition, one aspect of the membrane module unit of the invention may be a membrane module unit in which a plurality of membrane modules is coupled together in parallel by coupling means, the membrane module including a sheet-like filter membrane, holding frame members that hold the filter membrane at two opposed sides of a peripheral edge of the filter membrane, and supporting frame members that couple the holding frame members together at both ends thereof, wherein the coupling means clamps the holding frame members at the same sides of the filter membranes or the supporting frame members at the same ends of the holding frame members together at one end thereof by two opposed clamping members. The membrane module unit of the invention is not limited to the hollow fiber membrane module unit 10 of the illustrated example.

For example, the filter membrane is not limited to the hollow fiber membrane bundle, and may be a flat membrane or the like. In the case of a filter membrane of a type that can discharge permeated water from four sides of a sheet-like filter membrane, such as a flat membrane, the two remaining sides of the filter membrane that are not held by the holding frame members may be held by the supporting frame members, and the supporting frame members may be caused to serve as the holding frame members.

Additionally, the number of membrane modules to be coupled is also not particularly limited if the number is two or more. If the strength of the clamping members is sufficient, it is also possible to couple ten or more membrane modules.

Additionally, the membrane module units may be further coupled together.

Additionally, the shape of the holding frame members, the supporting frame members, and the frame is also not limited to the prismatic or angular tubular shape, and may be a columnar shape, a cylindrical shape, a cross-sectional U-shaped tubular shape, a plate shape, and the like.

Additionally, the aspect of clamping of the respective frame members by the coupling means 30 is also not particularly limited out to the aspect of the illustrated example. For example, only either the holding frame members 23 at the upper ends of the hollow fiber membrane bundles 22 or the holding frame members 23 at the lower ends of the hollow fiber membrane bundles 22 may be clamped together at both ends of the holding frame members by the coupling means 30.

Additionally, the supporting frame members 24 may be made to protrude upward of the upper holding frame members 23 and downward of the lower holding frame members 23, and the supporting frame members 24 at the same ends of the holding frame members 23 may be clamped together by the coupling means 30 at one end thereof that protrude more than the holding frame members 23.

Additionally, in the illustrated example, the case where the coupling means 30 that clamps the holding frame members 23 together comes off in the horizontal direction is assumed. Therefore, for prevention of coming-off, the holding frame members may be clamped together by a coupling means, and simultaneously, the supporting frame members may be clamped by the same coupling means, and the coupling means 30 at both ends of the holding frame members 23 may be further coupled together.

Additionally, the coupling means 30 is not limited to one that clamps the holding frame members 23 or the supporting frame members 24 together at one end thereof. For example, in a case where the hollow fiber membrane bundle 22 is split into a plurality of regions, and a void where the hollow fiber membrane bundle 22 is not held by the holding frame members 23 is present between the respective regions, the holding frame members 23 may be clamped together in the void. Additionally, the clamping between the supporting frame members 24 is possible in arbitrary portions.

Additionally, in the illustrated example, the longitudinal direction of the holding frame members 23 is made the horizontal direction and the longitudinal direction of the supporting frame member 24 is made the vertical direction. However, the longitudinal direction of the holding frame members 23 may be made the vertical direction, and the longitudinal direction of the supporting frame member 24 may be made the horizontal direction.

Additionally, in the illustrated example, the fastening means 35 couples two opposed clamping members 31 together from an up-and-down direction. However, the fastening means may be coupled together from the right and left depending on the shape, arrangement, or the like of the clamping members 31.

<Water Treatment Apparatus>

Figure 8:
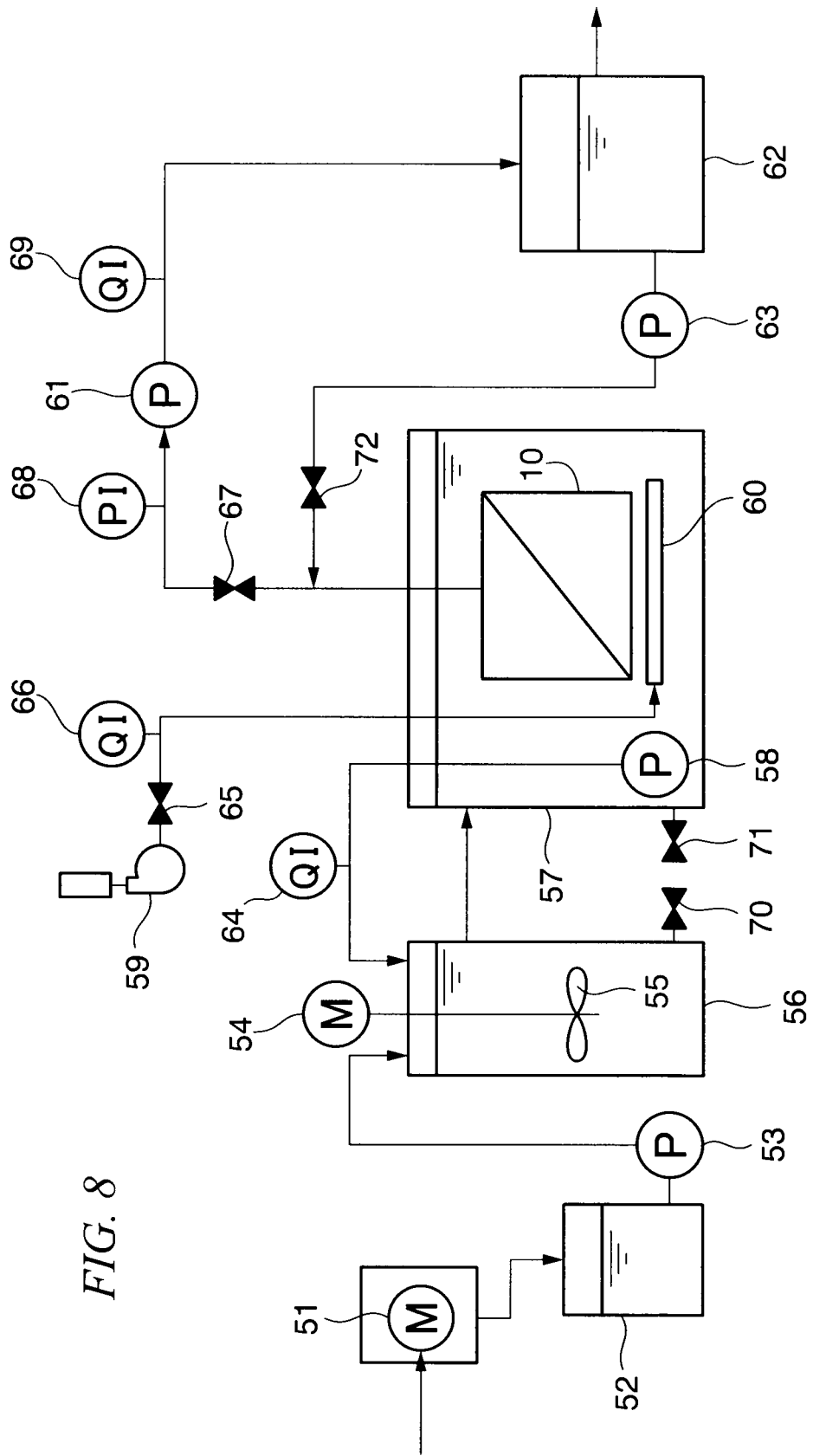
FIG. 8 is a schematic view showing an example of a water treatment system provided with a water treatment apparatus of the invention.

FIG. 8 is a schematic view showing an example of a water treatment system provided with the water treatment apparatus of the invention. This water treatment system is an example of a water treatment system by a membrane separation activated sludge process (MBR), and has a screen 51 that removes a relatively large solid content in raw water; an flow rate adjusting water tank 52 that reserves the raw water discharged from the screen 51, and adjusts the flow rate of the raw water that flows downstream; a water tank 56 for denitrification that brings the raw water supplied from the flow rate adjusting water tank 52 by a supply pump 53 into an anaerobic condition, thereby performing denitrification, and includes a stirring motor 54 and a stirring blade 55 connected thereto; a membrane immersion water tank 57 that brings the raw water and air supplied from the water tank 56 for denitrification into each other, and performs degradative treatment of organic substance or the like by an aerobic organism; a circulating pump 58 that is installed within the membrane immersion water tank 57, and returns the raw water to the water tank 56 for denitrification; the hollow fiber membrane module unit 10, 101, or 102 installed within the membrane immersion water tank 57; a diffuser pipe 60 (diffuser means) that is arranged below the hollow fiber membrane module unit 10, 101, or 102 within the membrane immersion water tank 57, and diffuses the air supplied from a blower 59; a permeated water tank 62 that reserves the permeated water that is filtered from the raw water side of the hollow fiber membrane module 20 toward the permeated water side thereof by a pressure differential caused by the filtering pump 61, and is discharged from the discharge ports 26 of the holding frame members 23 of the hollow fiber membrane modules 20; a backwashing pump 63 that supplies the permeated water for backwashing to the hollow fiber membrane module unit 10, 101, or 102 from the permeated water tank 62; a circulation water meter 64 that is provided on the downstream side of the circulating pump 58; a blower supply valve 65 and an air flow meter 66 that are provided on the downstream side of the blower 59; a filtering valve 67 and a pressure gauge 68 that are provided on the upstream side of the filtering pump 61; a permeated water meter 69 that is provided on the downstream side of the filtering pump 61; a water tank drain 70 for denitrification that is provided in the water tank 56 for denitrification; a membrane immersion water tank drain 71 provided in the membrane immersion water tank 57; and a backwashing valve 72 that is provided on the downstream side of the backwashing pump 63.

Since the water treatment apparatus of the invention described above has the membrane module unit of the invention, attachment, removal, and maintenance of the hollow fiber membrane module unit can be simply performed.

INDUSTRIAL APPLICABILITY

The membrane module unit of the invention is useful as a membrane module unit used for water treatment that performs solid-liquid separation, such as water-purifying treatment, industrial waste water treatment, or drainage treatment, and is particularly useful as a membrane module unit including a large-sized membrane module.

DESCRIPTION OF THE REFERENCE SIGNS

10: HOLLOW FIBER MEMBRANE MODULE UNIT (MEMBRANE MODULE UNIT)
101: HOLLOW FIBER MEMBRANE MODULE UNIT (MEMBRANE MODULE UNIT)
102: HOLLOW FIBER MEMBRANE MODULE UNIT (MEMBRANE MODULE UNIT)
20: HOLLOW FIBER MEMBRANE MODULE (MEMBRANE MODULE)
22: HOLLOW FIBER MEMBRANE BUNDLE (FILTER MEMBRANE)
23: HOLDING FRAME MEMBER
24: SUPPORTING FRAME MEMBER
30: COUPLING MEANS
31: CLAMPING MEMBER
32: GROOVE
35: FASTENING MEANS
350: FASTENING MEANS

The invention claimed is:

1. A membrane module unit, comprising:
a plurality of membrane modules coupled together in parallel by a coupling unit;
a sheet filter membrane; and
at least one holding frame member that holds the filter membrane at two opposed sides of a peripheral edge of the filter membrane, the at least one holding frame member having a water collection passage inside thereof and protruding laterally more than both side ends of the filter membrane,
wherein the coupling unit clamps the at least one holding frame member at the same sides of the filter membranes together by two opposed clamping members,
the clamping members are vertically opposed to each other at one end of each holding frame member that protrudes laterally more than both side ends of the filter membrane, and
wherein said coupling unit comprises said two opposed clamping members such that said clamping members are opposed to each other at one end of each holding frame member that protrudes laterally more than both side ends of a supporting frame members or a hollow fiber membrane bundle thereby connecting a plurality of the hollow fiber membrane modules in parallel and a fastening unit that couples the two opposed clamping members together.

2. The membrane module unit of claim 1, further comprising:
a self-standing frame,
wherein at least one clamping member of two opposed clamping members that clamp the at least one holding frame member, and the frame are combined together by combining means.

3. The membrane module unit of claim 2,
wherein the at least one clamping member that is combined with the frame by the combining means is fastened to the frame by a fastening unit near both ends of the clamping member.

4. A membrane module unit, comprising:
a plurality of membrane modules coupled together in parallel by a coupling unit;
a sheet filter membrane;
holding frame members that hold the filter membrane at two opposed sides of a peripheral edge of the filter membrane, the at least one holding frame member having a water collection passage inside thereof and protruding laterally more than both side ends of the filter membrane; and
at least one supporting frame member that couples the holding frame members near both ends of the holding frame members,
wherein the coupling unit clamps the holding frame members at the same sides of the filter membranes together by two opposed clamping members,
the clamping members are vertically opposed to each other at one end of each holding frame member that protrudes laterally more than both side ends of the supporting frame members or the filter membrane, and
wherein said coupling unit comprises said two opposed clamping members such that said clamping members are opposed to each other at one end of each holding frame member that protrudes laterally more than both side ends of a supporting frame members or a hollow fiber membrane bundle thereby connecting a plurality of the hollow fiber membrane modules in parallel and a fastening unit that couples the two opposed clamping members together.

5. The membrane module unit of claim 4,
wherein the coupling unit clamps the holding frame members at the same sides of either upper ends or lower ends of the filter membranes by two opposed clamping members.

6. The membrane module unit of claim 1,
wherein the clamping members are formed with a plurality of grooves into which the holding frame members or the at least one supporting frame member fit.

7. The membrane module unit of claim 1,
wherein the coupling unit further has fastening unit that couples the two opposed clamping members together.

8. The membrane module unit of claim 1,
wherein a dry mass of the membrane module is 25 kg or more.

9. The membrane module unit of claim 1,
wherein the coupling unit clamps the holding frame members at the same sides of the filter membranes at one end or both ends thereof by two opposed clamping members.

10. A method of manufacturing the membrane module unit of claim 4, the method comprising:
lifting a plurality of the membrane modules in parallel, and coupling the membrane modules together by the coupling unit.

11. A method of disassembling the membrane module unit of claim 4, the method comprising:
lifting the membrane module unit, and removing the coupling unit.

12. A method of maintaining the membrane module unit of claim 4, the method comprising:
lifting, and at least one selected from the group consisting of washing and checking the membrane module unit.

13. A water treatment apparatus, comprising:
a water tank;
the membrane module unit of claim 1 arranged within the water tank; and
a diffuser unit arranged below the membrane module unit.

14. The membrane module unit of claim 2,
wherein the at least one clamping member is formed with a plurality of grooves into which at least one holding frame member or supporting frame member fits.

15. The membrane module unit of claim 3,
wherein the at least one clamping member is formed with a plurality of grooves into which the at least one holding frame member or supporting frame member fits.

16. The membrane module unit of claim 4,
wherein the clamping members are formed with a plurality of grooves into which the holding frame members or the at least one supporting frame member fit.

17. The membrane module unit of claim 2,
wherein the coupling unit further has fastening unit that couples the two opposed clamping members together.

18. The membrane module unit of claim 4,
wherein the coupling unit further has fastening unit that couples the two opposed clamping members together.

19. The membrane module unit of claim 2, wherein the combining means is a fastening unit.

20. The membrane module unit of claim 1, wherein said peripheral edge of the filter membrane is an upper end and a lower end.

21. The membrane module unit of claim 1, wherein said clamping members have a comb tooth portion formed with a plurality of grooves into which the holding frame members fit, and a supporting portion having a U-shaped or L-shaped cross-section.

22. The membrane module unit of claim 1, wherein said filter membranes are positioned such that they are held perpendicular to the plane of the clamping members.

23. The membrane module unit of claim 4, wherein said peripheral edge of the filter membrane is an upper end and a lower end.

24. The membrane module unit of claim 4, wherein said clamping members have a comb tooth portion formed with a plurality of grooves into which the holding frame members fit, and a supporting portion having a U-shaped or L-shaped cross-section.

25. The membrane module unit of claim 4, wherein said filter membranes are positioned such that they are held perpendicular to the plane of the clamping members.

* * * * *